United States Patent
Miyamoto et al.

(10) Patent No.: US 7,415,323 B2
(45) Date of Patent: Aug. 19, 2008

(54) CONTROL APPARATUS AND PROGRAM FOR VEHICLES, AND METHOD FOR DEVELOPING THE PROGRAM

(75) Inventors: Seiji Miyamoto, Kariya (JP); Hiroyuki Ihara, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/734,285

(22) Filed: Dec. 15, 2003

(65) Prior Publication Data

US 2004/0128037 A1 Jul. 1, 2004

(30) Foreign Application Priority Data

Dec. 13, 2002 (JP) ............... 2002-362487

(51) Int. Cl.
*G06F 9/54* (2006.01)
*G06F 9/44* (2006.01)

(52) U.S. Cl. ............... 701/1; 701/29; 701/36; 703/24; 703/25; 703/26; 703/27; 710/62; 710/65; 710/72

(58) Field of Classification Search ...... 701/1, 701/36, 29; 703/24, 25, 26, 27; 710/62, 710/65, 72, 75; 719/312, 321
See application file for complete search history.

(56) References Cited

U.S. PATENT DOCUMENTS 6,236,910 B1  5/2001  Iwai et al. ............... 701/1

6,343,249 B1 * 1/2002 Sakai et al. ............... 701/48

(Continued)

FOREIGN PATENT DOCUMENTS

EP        1033654 A      9/2000

OTHER PUBLICATIONS

Technical Journal "Tech 1 Autonomous Object Orientation for Real-Time System Realization, vol. 12, pp. 61-82; Chapter 5: Real-time design realized by object orientation" authored by Masami Iwahashi, and published by CQ Publication Company, on Apr. 1, 2002.

(Continued)

*Primary Examiner*—Khoi H. Tran
*Assistant Examiner*—Brian J Broadhead
(74) *Attorney, Agent, or Firm*—Nixon & Vanderhye P.C.

(57) ABSTRACT

A vehicle control apparatus comprises: a computer operable to execute a control program, a first memory storing the control program, and a second memory storing the produced data. The control program includes: a platform program for inputting data from a hardware device and storing inputted data as first data in a first section of the second memory, an application program for processing for a vehicle control in accordance with an AP interface, and a coupling processing program. The coupling processing program performs mediation in the processing using the application program by converting the first data provided from the processing using the platform program to second data in accordance with the PF interface so that the second data is adapted to the AP interface. The application program executes vehicle control by using the second data. The platform program performs an operation at different predetermined intervals than the coupling program.

7 Claims, 8 Drawing Sheets

U.S. PATENT DOCUMENTS

| | | | |
|---|---|---|---|
| 6,449,541 B1* | 9/2002 | Goldberg et al. | 701/36 |
| 6,487,493 B2 | 11/2002 | Uekawa et al. | |
| 6,490,520 B2* | 12/2002 | Narumi et al. | 701/200 |
| 6,598,108 B1 | 7/2003 | Ashida et al. | |
| 6,633,801 B1* | 10/2003 | Durlacher et al. | 701/9 |
| 6,816,753 B2* | 11/2004 | Sakamoto et al. | 700/245 |
| 2003/0014521 A1* | 1/2003 | Elson et al. | 709/225 |
| 2003/0182032 A1* | 9/2003 | McWalter et al. | 701/29 |
| 2004/0128673 A1* | 7/2004 | Fuchs et al. | 719/310 |
| 2004/0205153 A1* | 10/2004 | Weisshaar et al. | 709/217 |

OTHER PUBLICATIONS

Technical Journal "Interface, vol. 24, No. 7, pp. 125-130, Chapter 4: Class-object/service/interrupt realizing object orientation by non-object orientation language" authored by Masami Iwahashi, and published by CQ Publication Company, on Jul. 1, 1998.

JP Notice of Rejection in Application No. 2002-362487 mailed Mar. 13, 2007.

European Search Report issued Sep. 12, 2007 in corresponding EP Application No. 03027645.5.

Panday, A.: "AIL: description of a global electronic architecture at the vehicle scale"; proceedings of the 2001 Conference on Design, Automation and Test in Europe, Mar. 13-16, 2001, pp. 113-115.

Lange, K.: "Herstellerinitiative Software—Manufacturer Initiative Software" VDI Berichte—Elektronik IM Kraftfahrzeuge, No. 1646, Sep. 27-28, 2001, pp. 183-199.

Stelting, S.: "Applied Java Patterns" [Online] Dec. 26, 2001, Prentice Hall, USA, Excerpt: description of patterns "Adapter", "Command" and "Mediator".

\* cited by examiner

CONTROL APPARATUS AND PROGRAM FOR VEHICLES, AND METHOD FOR DEVELOPING THE PROGRAM

CROSS REFERENCE TO RELATED APPLICATION

This application relates to and incorporates herein by reference Japanese Patent Application No. 2002-362487 filed on Dec. 13, 2002.

TECHNICAL FIELD OF NON-LIMITING EXEMPLARY EMBODIMENTS

Exemplary embodiments of the present invention relate to a control program for a vehicle, e.g., a program having a suitable construction as a built-in software for engine control, etc.

BACKGROUND OF NON-LIMITING EXEMPLARY EMBODIMENTS

A control apparatus for a vehicle for controlling the operation of each portion of the vehicle such as an automobile, etc. uses a computer such as a microcomputer, etc. In such a control apparatus for a vehicle, various kinds of controls are realized by executing a control program stored in a memory device such as a ROM, etc. by the computer.

The control program for a vehicle is generally constructed by dividing this control program into a platform program (PF) as a program depending on hardware, and an application program (AP) as a program depending on the control for the vehicle.

The platform program is for making the computer execute processing for inputting data from a hardware device and providing data based on these inputted data with respect to processing using the application program through an interface (PF interface) such as API (Application Program Interface), and outputting data acquired through this PF interface from the processing using the application program to the hardware device.

On the other hand, the application program is for making the computer execute processing using data inputted through this PF interface, and processing for generating data outputted through the PF interface. For example, the application program makes the computer execute processing for generating the data outputted through the PF interface on the basis of the data inputted through the PF interface.

Thus, the platform program includes a program for getting access to the hardware device. In contrast to this, the application program does not include a program for directly getting access to the hardware device. In the application program, input and output operations with respect to the hardware device are performed in the processing using the platform program through the PF interface. Thus, a developer of the application program can make the application program without being conscious of the detailed construction and the control method of hardware.

Further, for example, as disclosed in JP-A-07-040794, a control unit for an automobile has interface software for connecting an operating system and application software. An arithmetic calculation of signals required in the application software is made by the interface software. Thus, even when the hardware is changed, the "application software" can be permanently used only by rewriting the interface software.

However, in a maker of the control apparatus for a vehicle, there are many cases in which the development of plural control apparatus for vehicles having different required specifications is requested from a vehicle maker as a customer. It is necessary to newly make the application program in accordance with each of the required specifications. Accordingly, a technique for reducing development cost by diverting the platform program as much as possible and constructing the control program for a vehicle is adopted instead of the technique of diverting the "application program software" and making the control program for a vehicle.

To divert the platform program, for example, a common item is extracted between the different required specifications, and the platform program is constructed so as to provide the PF interface standardized by this common item. For example, the PF interface specification as the specification of the PF interface is standardized so as to provide data to the processing using the application program in a data format, data provision timing, etc. conformed to the most strict required specification among the respective required specifications.

For example, in an engine control apparatus, when processing based on a voltage value from a water temperature sensor for detecting the temperature of cooling water of the engine is performed, the required specification is V/256 as resolution of this voltage value in the engine control apparatus A of a certain vehicle kind. In contrast to this, the required specification is set to v/128 as resolution in the engine control apparatus B of another vehicle kind. In such a case, the PF interface specification for providing the PF interface for the processing using the application program is planned and determined by resolution V/256 conformed to the engine control apparatus A of fine resolution so as to satisfy the required specifications of the engine control apparatus of both the vehicle kinds in the processing using the platform program. The platform program is constructed so as to provide the PF interface along this PF interface specification. Thus, the same platform program can be diverted in the engine control apparatus having the different required specifications.

However, when the application program of the engine control apparatus B is made, the resolution of the required specification is V/128. In contrast to this, the resolution provided by the PF interface using the platform program is V/256. Therefore, it is necessary for a developer of the application program to build into the application program a resolution conversion processing program for compensating for the gap between the resolution of the PF interface specification using the platform program and the resolution of the required specification of the control apparatus for a vehicle of a developing object.

As such a required specification, there are various elements such as the kind of data, the type of data, fetch timing of data, etc. in addition to the resolution. When the application program utilizing the standardized platform program in the control apparatus for vehicles having the different required specifications is made, it is necessary for the developer of the application program to consider a method for realizing the required specification by always thinking of the PF interface specification provided by the platform program. Therefore, the burden of the developer of the application program is large.

SUMMARY OF NON-LIMITING EXEMPLARY EMBODIMENTS

Therefore, it is a feature of exemplary embodiments of the present invention to provide a control program for a vehicle, etc. which reduces the burden of the developer of the application program.

According to exemplary embodiments of the present invention, a control program for a vehicle is constructed by a platform program, an application program and a coupling processing program.

The platform program is a program for making a computer execute processing for inputting data from a hardware device and providing data based on inputted data to processing using the coupling processing program in accordance with a PF interface as an interface standardized so as to be commonly utilized by processing using the application program made in accordance with the required specification of a different control apparatus for a vehicle.

The coupling processing program is a program for making the computer execute processing for performing mediation in the processing using the application program by converting the data provided from the processing using the platform program in accordance with the PF interface so as to be adapted to an AP interface as an interface satisfying the required specification of the control apparatus for a vehicle of a developing object.

The application program is a program for making the computer execute processing using the data provided from the processing using the coupling processing program in accordance with the AP interface.

Thus, the coupling processing program mediates or bridges between the PF interface and the AP interface. Therefore, a developer of the application program can make the application program along an AP interface specification, i.e., an interface specification satisfying the required specification of the control apparatus for a vehicle of a developing object. Namely, it is not necessary for the developer of the application program to consider a method for realizing the required specification with the PF interface specification in mind. Accordingly, the burden of the developer of the application program can be reduced.

For example, an object standardized as such a PF interface is the structure of the data provided through the PF interface and update timing of these data, etc. In the application program made in accordance with a different required specification, data having the structure of different data are required, and timing for requiring the data, etc. are also different. For example, the matters of from which input object (e.g., which sensor) the data are provided, what accuracy the data have, and what data format (data structure) the data have, etc. are standardized and provided as the structure of the data.

Further, for example, in accordance with the control program for a vehicle, in the processing using the platform program, the data standardized and provided as the PF interface are provided in a data format of accuracy higher than that requested in the processing using the application program in the processing using the coupling processing program, the data format of the data provided through the PF interface is adjusted so as to form the data format satisfying the required specification of the application program, and the adjusted data are provided by the AP interface. In accordance with such a construction, data according to the required specification can be utilized without being conscious of what accuracy and data format the data in the PF interface have at the making time of the application program.

Further, for example, the coupling processing section is preferably constructed so as to adjust the sampling timing of data in the processing using the coupling processing program. In accordance with such a construction, the coupling processing section can be constructed such that the developer of the application program utilizes the data in timing according to the required specification without being conscious of how the sampling timing is set in the processing using the platform program at the making time of the application program.

For example, the AP interface can be set so as to perform the interfacing operation. Namely, the AP interface can be constructed such that the converted data can be referred by the processing using the application program. Otherwise, the AP interface can be constructed such that the converted data are transmitted to the processing using the application program when there is a request of the data by the processing using the application program. For example, the AP interface can be constructed such that data are stored in a memory, etc. at a memory address predetermined in the processing using the coupling processing program, and this memory is referred in the processing using the application program. Otherwise, the AP interface can be constructed such that processing is transferred from the processing using the application program to the processing using the coupling processing section e.g., as in API, and requested data or the address (pointer, etc.) of the data at its storing destination is stored in e.g., a stack, etc. in the processing using the coupling processing section. It is then returned to the processing using the application program, and the data or the address of the data at its storing destination is taken out of the stack, etc. The PF interface can also perform the interfacing operation by a method similar to such an interfacing method of the AP interface.

The coupling processing program may be constructed such that the data acquired and converted through the PF interface are provided through the AP interface as they are. However, for example, the coupling processing program is preferably set to a program for storing the data acquired through the PF interface to memory, and providing data acquired by converting the data stored in this memory through the AP interface. Further, the coupling processing program is preferably set to a program for storing data acquired by processing the data acquired through the PF interface to the memory, and providing the data stored in this memory through the AP interface.

For example, the platform program preferably has a program for processing for inputting data from the hardware device by interruption from the hardware device, and providing data based on this input result through the PF interface. The coupling processing program further preferably has an acquiring program for performing processing for receiving data through the PF interface during the inhibition of a dispatch of another processing, and storing the received data to the memory.

In accordance with such a construction, while "the processing for receiving data through the PF interface and storing these data to the memory" is performed by the acquiring section, the dispatch of another processing is inhibited so that consistency of the data is easily held. Further, in the processing using the application program, for example, the data stored in this memory can be acquired and utilized through the AP interface.

The construction of the control program for a vehicle is explained when the input processing of data from the hardware device is performed. However, the control program for a vehicle is similarly constructed when data are outputted to the hardware device. Namely, similar to the case of the input processing, the control program for a vehicle is divisionally constructed by a platform program, a coupling processing section and an application program.

For example, the platform program is set to a program for making a computer execute processing for acquiring data for an output from processing using the coupling processing program in accordance with a PF interface as an interface standardized so as to be commonly utilized by processing using the application program made in accordance with the required specification of a different control apparatus for a vehicle, and outputting data based on the acquired data.

The coupling processing program is set to a program for making the computer execute processing for converting the data provided from the processing using the application program so as to be adapted to the PF interface in accordance with an AP interface as an interface satisfying the required specification of the control apparatus for a vehicle of a developing object, and mediating the converted data in the processing using the platform program.

The application program is set to a program for making the computer execute processing for generating the data of an output object and providing these data of the output object to the processing using the coupling processing program in accordance with the AP interface.

In accordance with such a construction, it is sufficient for the developer of the application program to make the program so as to simply output data in accordance with the AP interface specification without being conscious of the specification of the PF interface. Namely, it is sufficient to make only the application program according to the required specification. Therefore, the burden of the developer of the application program can be reduced.

Various constructions can be adopted as the construction of the AP interface. However, for example, the AP interface is preferably constructed such that the AP interface itself obtains the data stored by the processing using the above application program by the processing using the coupling processing program. For example, the AP interface is preferably constructed such that data based on the acquired data are transmitted to the processing using the platform program and output processing to the hardware device is performed. In accordance with such a construction, the data of an arithmetic result (e.g., driving amount and driving timing) are automatically acquired by the processing using the coupling processing program only by simply calculating these data and storing these data to the memory means in the application. These data are then mediated to the processing using the platform program in appropriate timing and a data format satisfying the specification of the platform program. Accordingly, the developer of the application can smoothly develop the application.

In developing the program, when there is a control apparatus for a vehicle as a new developing object, the control apparatus for a vehicle already developed is reutilized as much as possible with respect to the platform program. Only a portion dissatisfying the required specification from a vehicle maker is corrected and the PF interface specification is determined. The AP interface specification as a specification of the AP interface is then determined in accordance with the required specification from the vehicle maker. Thus, if the PF interface specification and the AP interface specification are determined at the initial stage of the development of the control apparatus for a vehicle of the new developing object, the platform program, the coupling processing section and the application program can be developed in parallel with each other.

BRIEF DESCRIPTION OF THE DRAWINGS

The above and other objects, features and advantages of exemplary embodiments of the present invention will become more apparent from the following detailed description made with reference to the accompanying drawings. In the drawings.

DETAILED DESCRIPTION OF NON-LIMITING EXEMPLARY EMBODIMENTS

Figure 1:
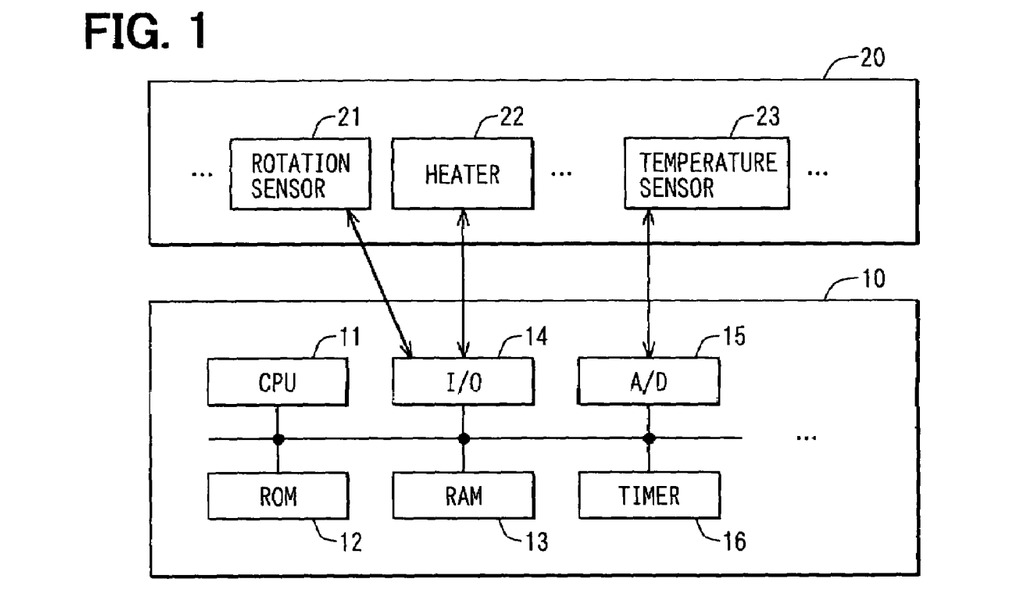
FIG. 1 is a block diagram showing a control apparatus for a vehicle according to an embodiment of the present invention.

The exemplary embodiments of the present invention will be explained with reference to the drawings. The present invention is not limited to the embodiments described below, but various modifications can be made. A control apparatus for a vehicle of this embodiment is an engine ECU for controlling the operation of an engine. FIG. 1 illustrates the construction of portions required in the explanation of this embodiment.

As shown in FIG. 1, the engine ECU 10 is constructed with a CPU 11, a ROM 12, a RAM 13, an input/output circuit (I/O) 14, an A/D converter 15, a timer 16, etc., bus lines connecting these members, etc. The engine ECU 10 of this embodiment is differentiated from a conventional engine ECU in the construction of a program stored in a ROM 12. Various kinds of devices 20 for engine control such as an engine rotation sensor 21, an oxygen (O2) sensor heater 22 and a water temperature sensor 23 are connected to the I/O 14 and the A/D converter 15 through a driving circuit, etc.

Signals are inputted from such devices 20 for engine control and are outputted to the devices 20 for engine control by executing the program stored in the ROM 12 by the CPU 11. For example, a pulse generated every predetermined rotation angle (e.g., every 180 degrees) of a crankshaft from the engine rotation sensor 21 is inputted from the I/O 14, and an O2 sensor heater control signal for PWM-controlling the operation of the O2 sensor heater 22 for heating an O2 sensor until a predetermined operating temperature is outputted to the I/O 14 by processing using the CPU 11. Further, a voltage value corresponding to water temperature is inputted from the water temperature sensor 23 through the A/D converter 15, and is fetched to the RAM 13, etc. as digital data.

Figure 2A:
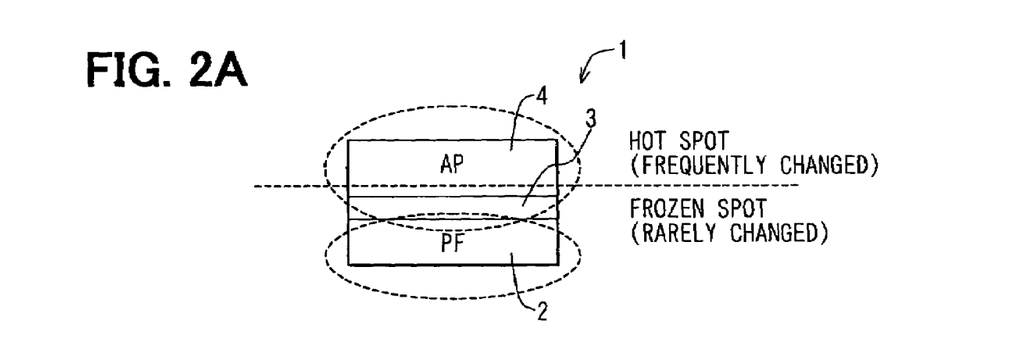
FIGS. 2A and 2B are explanatory diagrams showing a control program for a vehicle according to the embodiment.

As shown in FIG. 2A, to execute such a control by the CPU 11, the program 1 stored in the ROM 12 is constructed by linking a platform program 2 (shown by PF in this figure), a coupling processing section 3 corresponding to a coupling processing program, and an application program 4 (shown by AP in this figure).

The platform program 2 is a program including a device driver for making the CPU 11 execute processing (processing depending on hardware) for controlling the operation of a hardware device such as the I/O 14, the A/D converter 15, etc. In contrast to this, the application program 4 is a program for making the CPU 11 execute processing (processing (judgment processing, arithmetic processing, etc.) depending on control for a vehicle) for realizing a required specification from a vehicle maker without performing processing for directly controlling the operation of the hardware device such as the I/O 14 and the A/D converter 15. The coupling processing section 3 is a program for making the CPU 11 execute processing for performing mediation between the processing of the CPU 11 using the application program 4 and the processing of the CPU 11 in the platform program 2.

The platform program 2, the coupling processing section 3 and the application program 4 are separately developed. The platform program 2 utilizes a program used in the conventional engine ECU already developed. In contrast to this, the coupling processing section 3 and the application program 4 are newly developed.

Figure 2B:
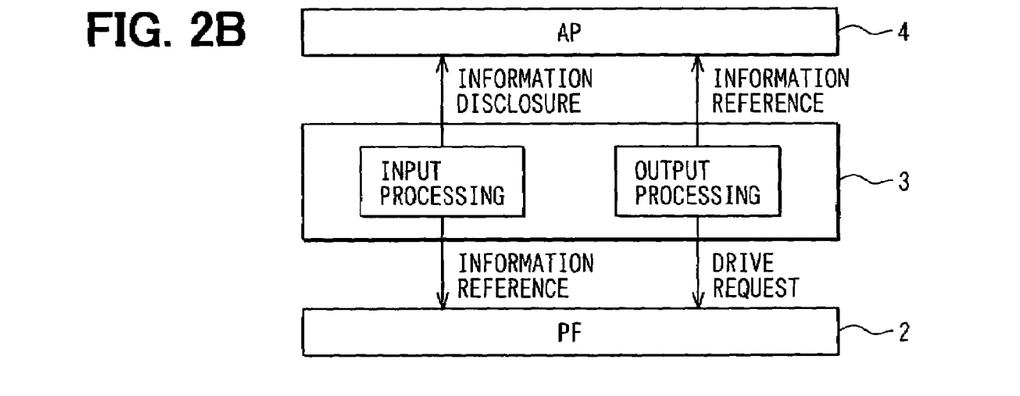

In the platform program 2, as shown in FIG. 2B, driving requests of the I/O 14 and the A/D converter 15 from the processing using the coupling processing section 3 are received and the I/O 14 and the A/D converter 15 are operated. Further, processing able to refer to information acquired from the I/O 14 and the A/D converter 15 from the processing using the coupling processing section 3 is performed. Thus, an interface (PF interface) with respect to the processing of the coupling processing section 3 is provided. This PF interface is standardized and constructed so as to satisfy the required specification of the engine ECU of a conventional vehicle type already developed.

The coupling processing section 3 is a program for making the CPU 11 execute processing for converting the information acquired through the PF interface to information satisfying the required specification of the application program 4 of a developing object and able to refer to the converted information from the processing of application program 4, and processing for referring to the information of an output object according to the required specification generated by the processing using the application program 4 and converting this referred information to information required in the PF interface and outputting the converted information to the I/O 14 through the PF interface.

The developer of the application program 4 can develop the application program by arranging such a coupling processing section 3 in consideration of only the required specification without being conscious of the specification of the PF interface. This required specification includes a specification relating to an AP interface such as the timings of inputted and outputted data, a data format, etc., and a control specification for a vehicle utilizing data acquired through the AP interface. With respect to the control specification, there are frequently requests of changes from the vehicle maker side even while the application program 2 is developed. In contrast to this, the specification relating to the AP interface is approximately fixed at the initial stage of the development. Accordingly, the specification of the AP interface can be determined at the initial stage of the development. Further, since the specification of the PF interface is diverted from an already standardized specification, the development of the coupling processing section 3 can be advanced from the initial stage of the development.

In contrast to this, with respect to the application program 2, the development can be advanced consciously of only the required specification from the initial stage of the development. Even when there is a change in the control specification during the development, it is not necessary to change the AP interface and it is sufficient to change only a control portion in accordance with the control specification.

An example of the detailed construction of the program 1 having such a coupling processing section 3 will be explained by showing this example in a figure.

Figure 3A:
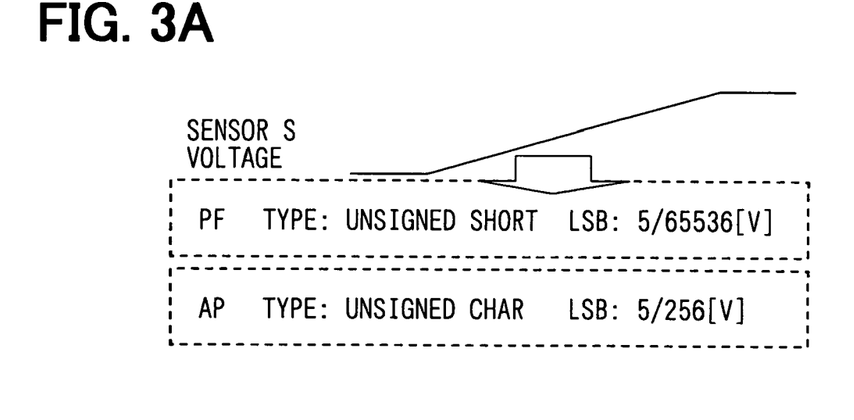
FIGS. 3A and 3B are explanatory diagrams showing conversion processing of a data format using the control program for a vehicle of the embodiment.

For example, as shown in FIG. 3A, the explanation will be made with respect to a case in which the standardization is performed so as to provide data in a data format of 5/65536 [V] in value shown by LSB in an unsigned short type by the PF interface, and the data format of the required specification is of an unsigned char type and the value indicated by the LSB is 5/256 [V].

Figure 3B:
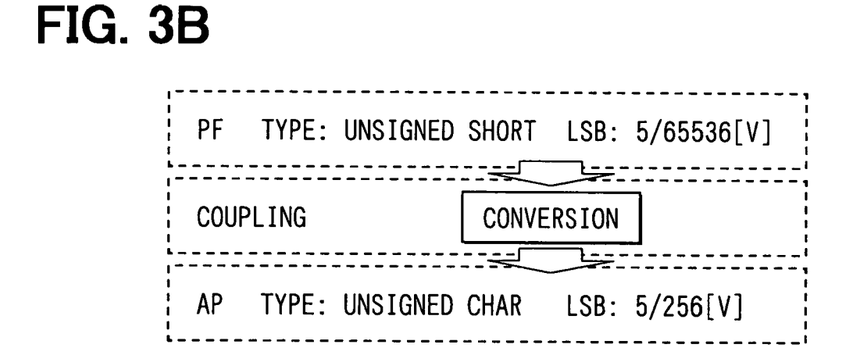

In this case, as shown in FIG. 3B, the coupling processing section 3 is constructed such that the CPU 11 executes conversion processing with respect to the type of data received from the processing using the platform program 2 and the corresponding value of the LSB.

Namely, the coupling processing section 3 has a command code for making the CPU 11 execute the conversion processing in which the data of 5/65536 [V] in value indicated by the LSB in the unsigned short type are acquired through the PF interface, and are converted (processed) to data of 5/256 [V] in value indicated by the LSB in the unsigned char type, and also execute processing able to refer to the converted data from the processing using the application program 4. For example, the AP interface is constructed such that the converted data are stored in the RAM 13 at a predetermined address in the processing using the coupling processing section 3, and the value of the RAM 13 at this address is acquired in the processing using the application program 4. Thus, it is possible to refer to data along the required specification in accordance with the processing using the application program 4.

Figure 4:
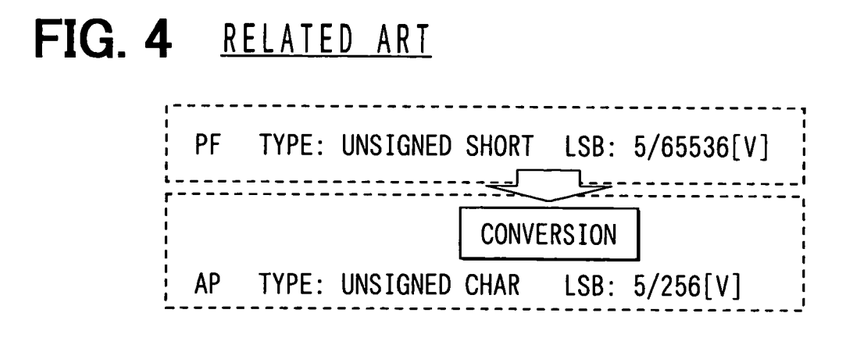
FIG. 4 is an explanatory diagram showing conversion processing of a data format using a control program for a vehicle according a related.

In the construction of the exemplary control program for a vehicle according to a related art, as shown in FIG. 4, it is necessary to perform the conversion processing in which the data of the data format of 5/65536 [V] in value indicated by the LSB in the unsigned short type provided by the processing using the platform program 2 are acquired by the processing using the application program, and are converted to data of 5/256 [V] in value indicated by the LSB in the unsigned char type as a data format satisfying the required specification in the processing using the application program. Accordingly, it is necessary to perform such conversion processing within the application program. It is necessary for the developer of the application program to develop the application program while the developer is always conscious of this respect. Therefore, the burden of the developer of the application program is large. However, the developer of the application program 4 can develop the application program 4 simply in consideration of only the required specification without being conscious of the data format of the PF interface by arranging the above coupling processing section 3.

An example for adjusting the acquiring timing of data will next be shown in the processing using the coupling processing section 3.

Figure 5A:
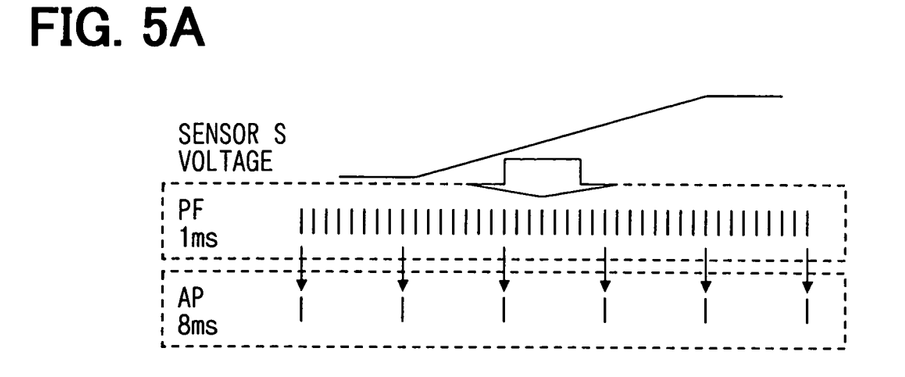
FIGS. 5A and 5B are explanatory diagrams showing sampling timing using the control program for a vehicle of the embodiment.

As shown in FIG. 5A, the PF interface provided in the processing using the platform program 2 is standardized by the construction that data capable of being referred from the processing using the coupling processing section 3 are updated every 1 ms. In contrast to this, the data are utilized every 8 ms in the required specification. However, these data utilized every 8 ms are set to data fetched every 16 ms.

Figure 5B:
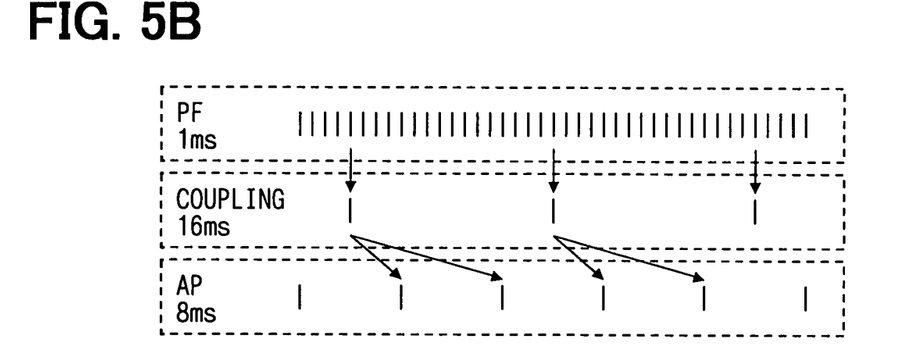

In this case, as shown in FIG. 5B, the platform program 2 has a command code for making the CPU 11 execute processing for fetching the voltage value of the water temperature sensor 23 to the RAM 13 under the management of the platform program 2 through the A/D converter 15 every 1 ms. The platform program 2 also has a command code for making the CPU 11 execute processing for transmitting the voltage value fetched to the RAM 13 under the management performed by the platform program 2 to the processing using the coupling processing section 3 in accordance with a request from the processing using the coupling processing section 3.

The coupling processing section 3 has a command code for making the CPU 11 execute processing for requesting the voltage value with respect to the processing using the platform program 2 every 16 ms, and receiving the voltage value fetched to the memory under the management in the processing using the platform program 2, and storing the received voltage value to the memory under the management performed by the processing of the coupling processing section 3. Further, the AP interface is provided by arranging a command code for performing processing for transmitting the voltage value stored in the memory under the management of the processing using this coupling processing section 3 to the processing using the application program 4 in accordance with a request from the processing using the application program 4.

The application program 4 has a command code for performing processing for requesting the voltage value from the coupling processing section 3 every 8 ms, and receiving the voltage value from the processing using the coupling processing section 3 and utilizing this voltage value.

An AP interface for directly referring to the memory under the management of the processing using this coupling processing section 3 from the processing using the application program 4 and acquiring the voltage value may be also set.

The platform program 2 also has a command code for executing the operation of the coupling processing section 3 at an interval within 16 ms, and executing the operation of the application program 4 at an interval within 8 ms.

When the CPU 11 executes such a control program 1 for a vehicle, as shown in FIG. 5B, the voltage value is acquired and stored through the PF interface every 16 ms in the processing using the coupling processing section 3, and this stored voltage value is utilized every 8 ms by the processing of the application program 4.

Figure 6:
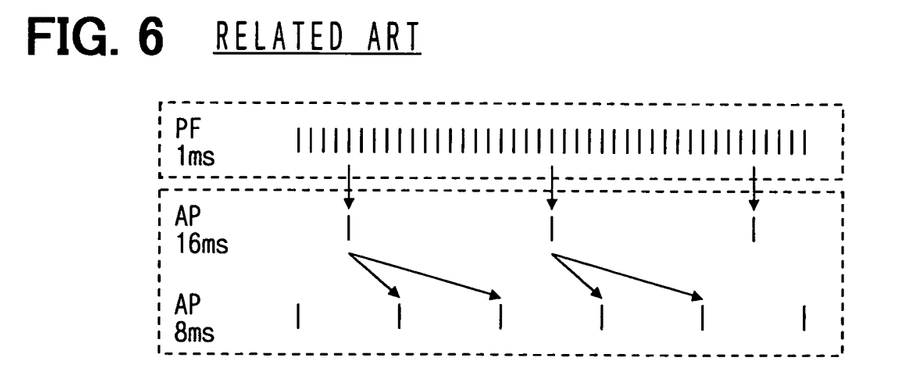
FIG. 6 is an explanatory diagram showing sampling timing using the control program for a vehicle according to the related art.

Thus, in the application program 4, the voltage value sampled every 16 ms and satisfying the required specification can be utilized every 8 ms by arranging the coupling processing section 3. Namely, the developer of the application can develop the application program 4 without requiring the consciousness that sampling timing conversion must be performed within the processing using the application program as in the example according to a related art shown in FIG. 6.

Figure 7:
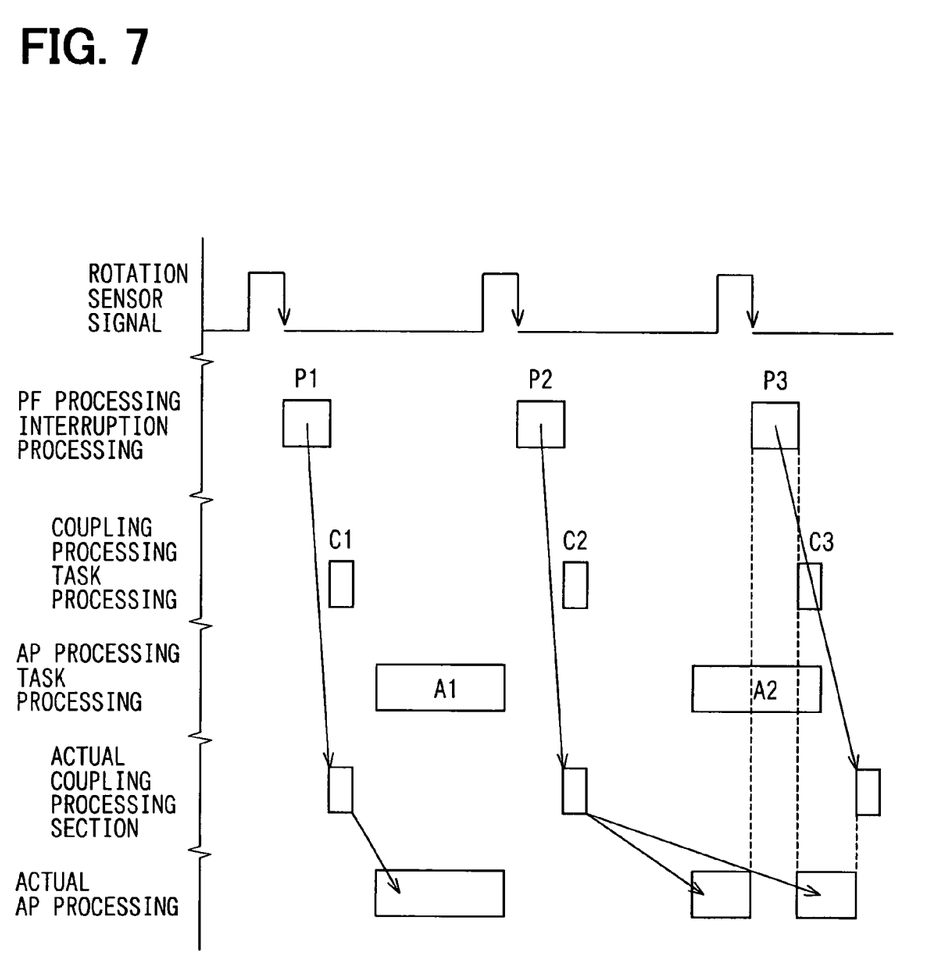
FIG. 7 is an explanatory diagram showing interruption processing using the control program for a vehicle of the embodiment.

An example for applying the present invention to interruption processing will next be explained. As shown in FIG. 7, interruption is performed in the CPU 11 from the I/O 14 by the fall of a signal pulse from the engine rotation sensor 21. Thus, the CPU 11 executes an interruption processing routine (P1, P2, P3) arranged in the platform program 2. This interruption processing routine of the platform program 2 has a command code of the CPU 11 for performing processing for calculating a passing time from the previous executing time of this interruption processing routine by acquiring the counting value of the timer 16, and calculating an engine rotation number on the basis of this passing time, and storing the engine rotation number in a memory area of the RAM 13 under the management of the platform program 2. Further, the platform program 2 has a command code of the CPU 11 for performing processing for transmitting the rotation number stored in the memory area of the RAM 13 under the management of this platform program 2 to the processing using the coupling processing section 3 in accordance with a request from the processing using the coupling processing section 3. The platform program 2 has a command code for starting a task (corresponding to an acquiring program) of the coupling processing section 3. The task of the coupling processing section 3 is started by executing this command code by the CPU 11.

This task has a command code for requesting a rotation number in the processing of the platform program 2. This task also has a command code for performing processing for storing the rotation number received from the processing using the platform program 2 in the memory area of the RAM 13 under the management of the coupling processing section 3. This task further has a command code for performing processing for transmitting the rotation number stored in the memory area of the RAM 13 under the management of this coupling processing section 3 to the processing using the application program 4 when there is a request of the rotation number from the processing using the application program 4.

A rotation number utilizing processing section of the application program 4 as a program for realizing a function satisfying the required specification by utilizing the engine rotation number has a command code for requesting the rotation number with respect to the processing using the coupling processing section 3 in each section for referring to the engine rotation number.

The platform program 2 has a command code for setting the executing level of the interruption processing section to be higher than the executing levels of the other program portions, and setting the executing level of the coupling processing section 3 to be equal to or lower than the executing level of the application program 4. The CPU 11 executes the command code of a program for setting this executing level in advance. The platform program 2 also has a command code for performing processing for determining the task to be executed in accordance with the executing level.

In accordance with such a construction, as shown in FIG. 7, the CPU 11 executes the interruption processing routine of the platform program 2 by the fall of a pulse of the engine rotation sensor signal, and calculates the engine rotation number and stores the engine rotation number in the memory area of the RAM 13 under the management of the platform program 2. When no application program 4 is being executed by the processing using the platform program 2, a task processing portion C1 of the coupling processing section 3 is executed as post-interruption processing P1 shown in FIG. 7, and the rotation number is requested with respect to the processing using the platform program. In the processing using the platform program, the rotation number is transmitted to the processing using the coupling processing section 3. The rotation number is received by the processing of the task processing portion C1 of the coupling processing section 3, and is stored in the memory area of the RAM 13 under the management of the coupling processing section 3. An application A1 is then executed in the platform program 2.

When the rotation number is referred in the application A1, the rotation number is required in the processing using the coupling processing section 3. The rotation number stored in the memory area of the RAM 13 under the management of the coupling processing section 3 is transmitted in the processing using the coupling processing section 3. In the processing of the application program 4, this rotation number is received and utilized in control processing for a vehicle.

As shown in FIG. 7, when interruption is generated by the engine rotation sensor signal during the processing of an application A2 and interruption processing P3 of the platform program 2 is executed, the operation of the coupling processing section C3 is started by the platform program 2 after the interruption processing P3 is completed. However, the executing level of the coupling processing section C3 is set to be equal to or lower than the executing level of the application A2. Therefore, in the processing using the platform program 2, commands from an interrupting time point provided by the interruption of the application A2 are first executed by postponing the execution of the coupling processing section C3.

Therefore, in the application A2, the interruption processing P3 is performed on the way, but the rotation number stored in the memory area of the RAM 13 under the management of the coupling processing section C2 is acquired and utilized in the processing when the rotation number is referred.

Thus, the program is constructed such that the rotation number is acquired through the processing using the coupling processing section 3 in the processing using the application program 2. Accordingly, the developer of the application program 4 can develop the application program 4 only by simply knowing the specification of the AP interface giving and taking information with respect to the coupling processing section 3 without being conscious of the specification of the platform program 2.

Figure 8A:
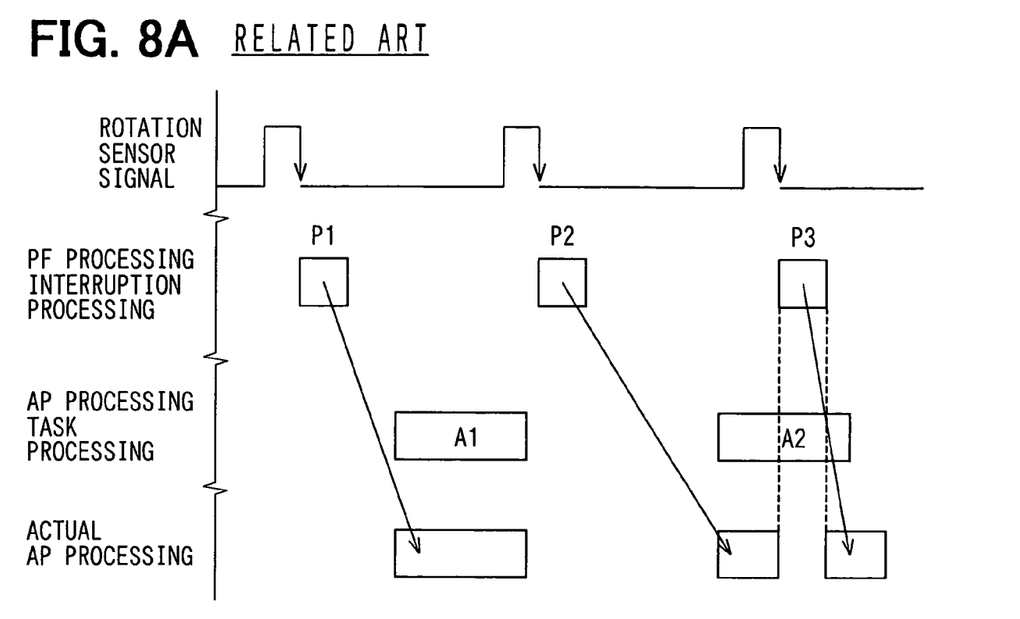
FIGS. 8A and 8B are explanatory diagrams showing interruption processing using the control program for a vehicle according to the related art.

Namely, the above coupling processing section 3 does not exist in the related art. Therefore, when the rotation number is referred during the processing of the application A1 as shown in FIG. 8A, the rotation number stored in the memory in the interruption processing P1 of the platform is provided from the platform. In this case, even when the rotation number of the platform is referred plural times during the application A1, all the acquired rotation numbers are the same value during the application A1 so that no problem is caused. However, when the application processing A2 is executed after the interruption processing P2 and interruption is generated by the engine rotation sensor signal during this application A2, the processing of the application A2 is interrupted and the interruption processing P3 using the platform program 2 is executed.

After the interruption processing P3 is completed, the application processing A2 is restarted. As a result, since the rotation number is updated to a new value during the interruption processing P3, processing using the rotation number by the interruption processing P2 acquired from the platform is performed in a portion of the application processing A2 before the interruption. Further, processing using the rotation number by the interruption processing P3 acquired from the platform is performed in a portion of the application processing A2 after returning from the interruption processing P3. Thus, no consistency can be held with respect to data based on data from the hardware device within the application processing of one unit. Therefore, it is necessary for the developer of the application to understand a restricting condition of such a platform in the related art.

Figure 8B:
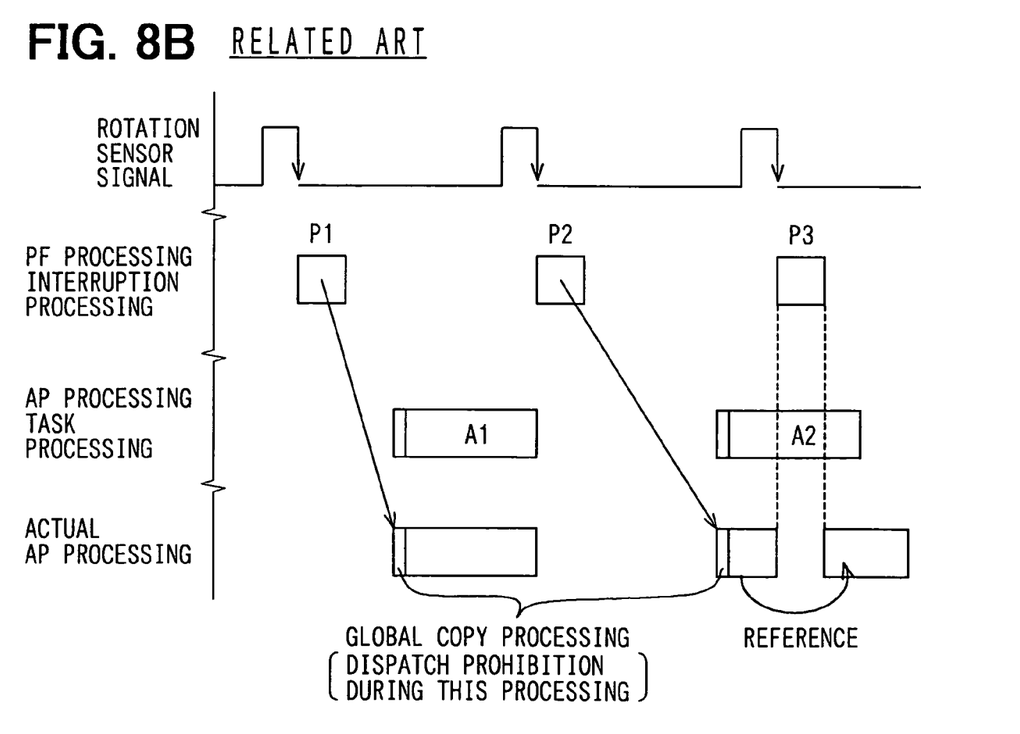

For example, as shown in FIG. 8B, it is necessary for the developer to perform dispatch inhibition processing at the head of the application processing so as not to be influenced by the interruption, and processing for calling the API of the platform and fetching the rotation number and storing the rotation number (making a global copy) to the memory under the self management, and subsequent application processing by using this globally copied rotation number. Thus, the developer of the application program must make the application program by fully knowing the specifications (restricting conditions) of the platform and compensating for the gap between the specifications.

If the application maker makes such specifications of the platform without understanding such specifications well, a problem such as an error in operation, etc. are sometimes caused as in e.g., FIG. 8A, and the made application program is not operated in accordance with the intension of the application maker. In such a case, since no developer of the application understands the specifications of the platform, it is difficult to specify the cause of the operation abnormality.

On the other hand, when plural applications (e.g., tasks) are operated and the global copy is made with respect to all the applications, overhead such as consumption of the memory area, consumption of a processing time, etc. is increased. Therefore, it is necessary to judge in which application no consistency (simultaneous property) of data within the processing is held with reference to the specification of the platform and the specification of the application. Therefore, the burden of the developer of the application is large and it became an obstacle in raising development efficiency.

However, in accordance with the construction of this embodiment shown and explained in FIG. 7, it is not necessary to make the global copy during the application program shown in FIG. 8B. Further, it is not necessary to consider in which application program the global copy is required or not, etc. Accordingly, productivity of the application can be improved.

In the above case, data are inputted in the processing using the application program. However, when data are outputted in the processing using the application program, the processing is also performed through the coupling processing section 3 instead of the construction that the interface provided by the platform program is directly accessed as in the related art.

Figure 9A:
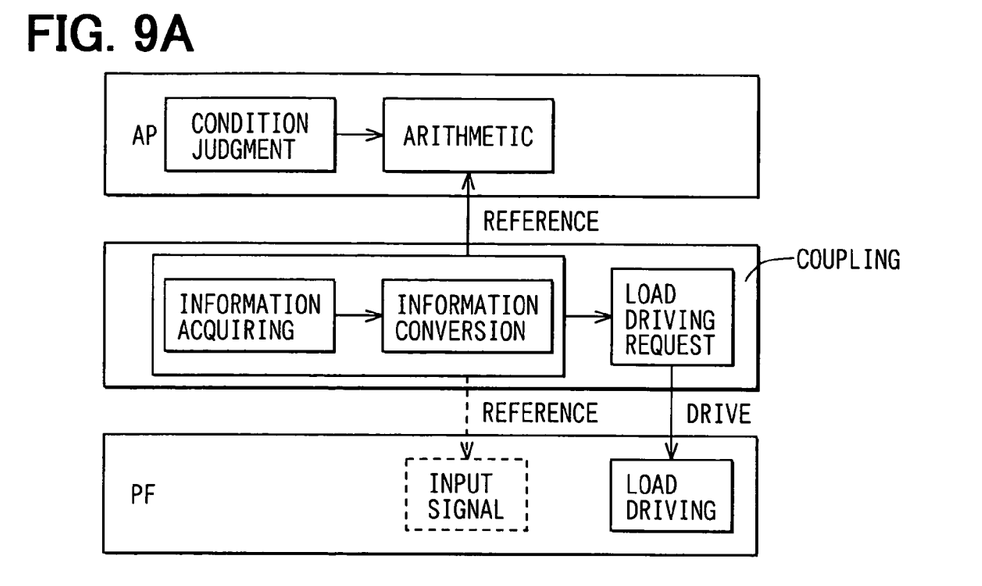
FIGS. 9A and 9B are explanatory diagrams showing output processing of data using the control program for a vehicle of the embodiment.

For example, as shown in FIG. 9A, the application program 4 has a command code for executing condition judgment processing and arithmetic processing by the CPU 11. The operation of the coupling processing section 3 is executed by the processing using the platform program 2 e.g., every predetermined period.

The coupling processing section 3 has a command code for making the CPU 11 execute information acquiring processing for acquiring data acquired by arithmetic processing using the application program 4, information conversion processing for converting the data acquired by the information acquiring processing to a data format used in load driving processing using the platform program 2, and load driving request processing for executing the load driving processing using the platform program 2. In the platform program 2, the load driving processing is performed when there is a load driving request.

Figure 9B:
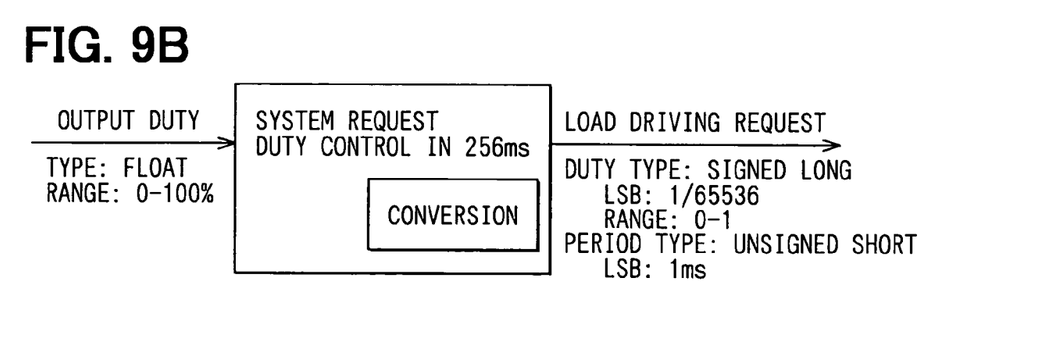

For example, as shown in FIG. 9B, after the engine is started and a predetermined time has passed, the operation of the O2 sensor heater 22 is controlled in accordance with the water temperature at the engine starting time, and duty control is set to be performed in a period of 256 ms as the required specification.

In this case, in the platform program, the API of the platform for operating the O2 sensor heater 22 is set to O2H_Duty Out (period, Duty) as shown in FIG. 9B. The data type of the period is set to the unsigned short type, and the corresponding value of the LSB is set to 1 ms. The data type of the Duty is set to a signed long type, and the corresponding value of the LSB is set to 1/65536. The data range of the duty is set to 0 to 1, and no operation is guaranteed except for this range.

On the other hand, the required specification is set such that the Duty outputted by the arithmetic processing of the application program 4 is of a float type, and the range is 0 to 100%, and the duty control is performed in a period of 256 ms required in the system.

Figure 11:
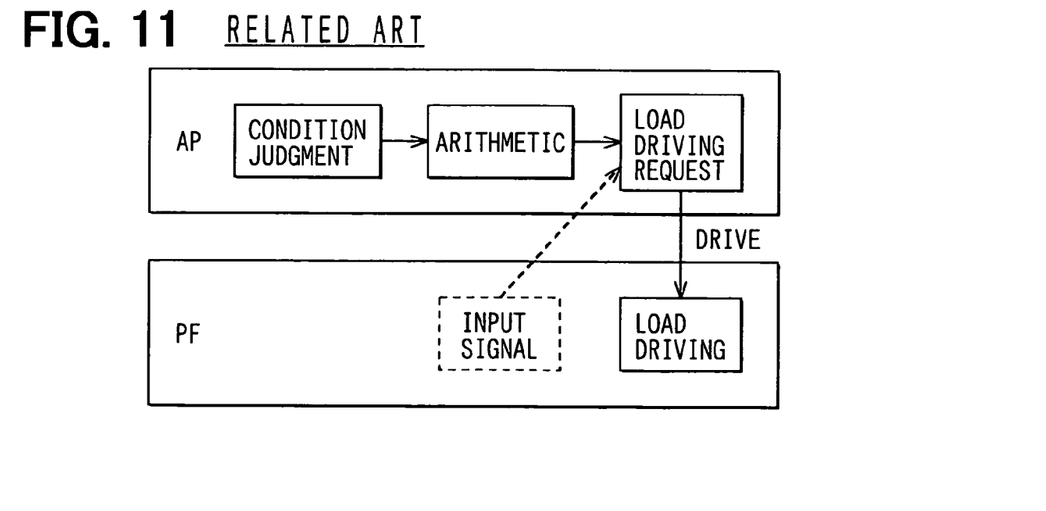
FIG. 11 is an explanatory diagram showing output processing of data using the control program for a vehicle according to the related art.
Figure 12:
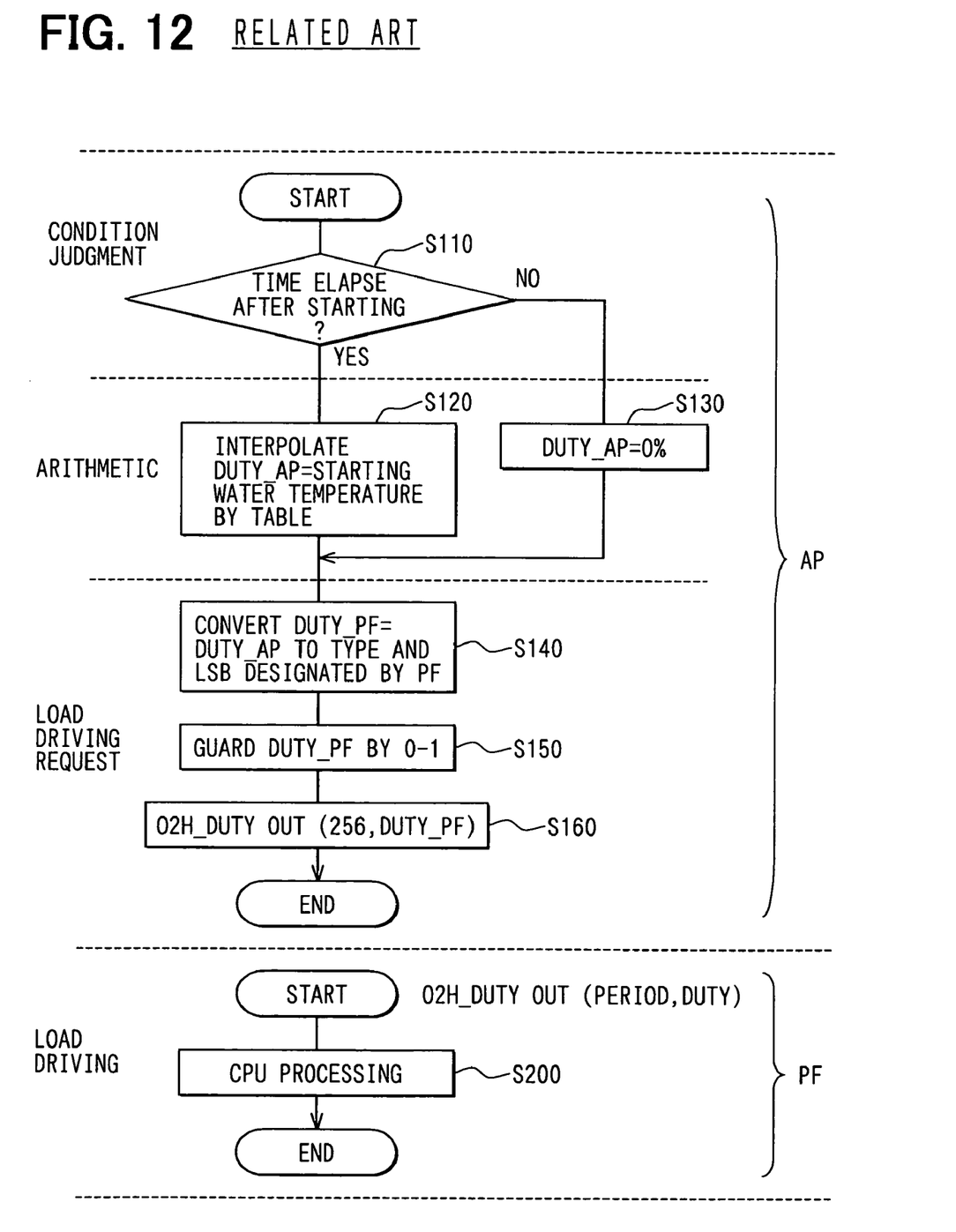
FIG. 12 is a flow chart showing the output processing of data using the control program for a vehicle according to the related art.

At this time, in the application program according to a related art, as shown in FIGS. 11 and 12, it is usually necessary to construct the duty of the float type outputted by the arithmetic processing within the application such that this duty of the float type is converted to a type assigned by the platform and the corresponding value of the LSB and the API of the platform is called.

Specifically, the processing is performed in each of the application program and the platform program as shown in FIG. 12. Namely, the condition judgment processing, the arithmetic processing and the load driving request processing are performed in the application program, and the load driving processing is performed in the platform program.

In the application program, it is judged at step S110 whether a predetermined time has passed or not after the engine is started. When the predetermined time has passed (S110:yes), it proceeds to a step S120 and Duty_AP is calculated by predetermined processing (interpolation using a water temperature interpolating table at the starting time). In contrast to this, when no predetermined time has passed after the engine is started (S110: no), no heater control is required. Accordingly, it proceeds to a step S130, and Duty_AP is set to 0%.

At step S140, Duty_AP is converted into a type used as an argument of the API (platform command) of the platform and a value indicated by the LSB, and is calculated as Duty_PF. Namely, the conversion from the float type to the signed long type is performed such that the value indicated by the LSB after the conversion is 1/65536. In subsequent step S150, Duty_PF is guarded from 0 to 1 in accordance with the specification of the platform. At step S160, the period is set to 256 (ms), and Duty is set to Duty_PF, and the platform command O2H—Duty is called. Thus, it is necessary for the developer of the application to arrange conversion processing within the application consciously of the restricting condition of the platform.

On the platform side, the operation of hardware is actually controlled and heater control is performed on the basis of the value (argument) set at the calling time in accordance with this calling (S200).

Thus, a function provided by the platform program is directly utilized from the application program. Therefore, the operational specification of the platform program becomes a restricting condition when the application program is made. It is necessary for the developer of the application program to build a routine (e.g., a command code of the CPU 11) for removing such a restricting condition into the application by always paying attention to such a restricting condition and taking care of input and output timings, a data format, etc.

Furthermore, in the application program, the frequencies of additions, changes, etc. of functions were high and it is difficult to add and change these functions while paying attention to such a restricting condition.

Figure 10:
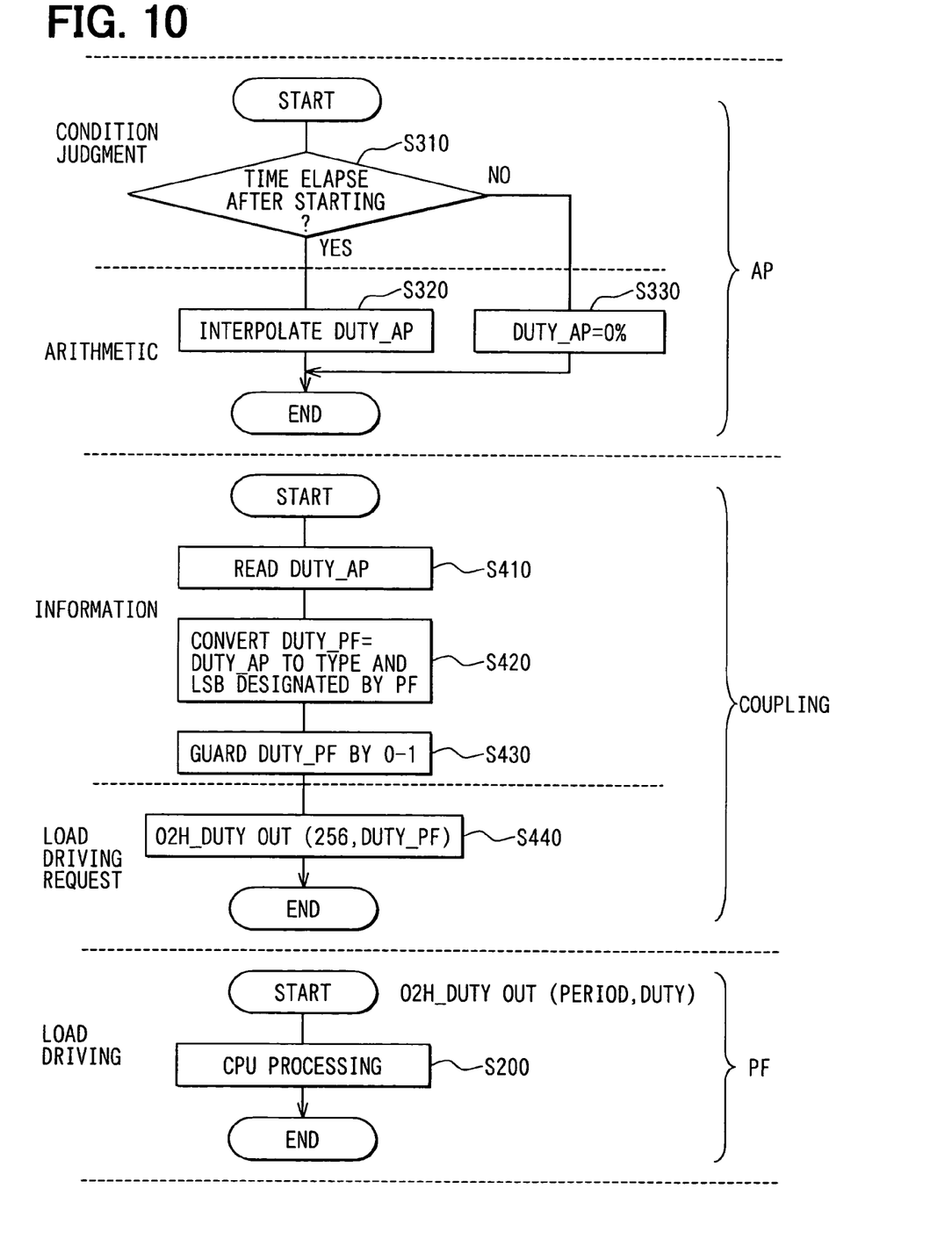
FIG. 10 is a flow chart showing the output processing of data using the control program for a vehicle of the embodiment.

Therefore, in this embodiment, the program construction according to the related art shown in FIG. 12 is changed as shown in FIG. 10. Namely, In this embodiment, as shown in FIG. 10, processings corresponding to steps S140 to S160 in FIG. 12 performed by the application program are performed in the coupling processing section 3 as shown by steps S420 to S440 of FIG. 10. Further, processing S410 for reading DutyAP calculated by steps S310 to S330 of the application program 4 is performed in the coupling processing section 3. Thus, as shown in FIG. 10, information work processing and the load driving request processing are performed by the processing using the coupling processing section 3.

As this result, it is sufficient to simply construct the application program 4 such that the CPU 11 executes the condition judgment processing and the arithmetic processing as in steps S310 to S330 of FIG. 10. Thus, with respect to output processing, the developer of the application can also develop the application without taking care of the interface specification of the platform program.

In this embodiment, the present invention is explained in the example of the engine ECU, but can be also applied to the program development of ECUs for various vehicles. Other modifications and alterations are possible without departing from the spirit of the invention.

The invention claimed is:

1. A control apparatus for a vehicle comprising:
   a computer operable to execute a control program;
   a first memory operable to store the control program; and
   a second memory operable to store data produced in processing of the computer,
   wherein the control program comprises:
   a platform program for making the computer execute processing for inputting data from a hardware device and store inputted data as first data in a first section of the second memory, the first section being under management of the platform program;
   an application program for making the computer execute processing for a vehicle control in accordance with an AP interface; and
   a coupling processing program,
   wherein the platform program provides the first data of the first section to processing using the coupling processing program in accordance with a PF interface as an interface standardized so as to be commonly utilized by processing using the application program made in accordance with a required specification,
   wherein the coupling processing program makes the computer execute processing for performing mediation in the processing using the application program by converting the first data provided from the processing using the platform program to second data in accordance with the PF interface so that the second data is adapted to the AP interface as an interface satisfying the required specification, the second data being stored in a second section of the second memory that is under management of the coupling processing program, and
   wherein the application program makes the computer execute the processing for a vehicle control by using the second data stored in the second section;
   the platform program makes the computer perform an inputting and storing operation at every first predetermined interval; and
   the coupling program makes the computer perform a converting and storing operation at every second predetermined interval, the second predetermined interval being different from the first predetermined interval.

2. The control apparatus for a vehicle according to claim 1, wherein an object standardized, for the PF interface, is a structure of data provided through the PF interface and update timing of the provided data.

3. The control apparatus for a vehicle according to claim 1, wherein the platform program has a program for making the computer execute processing for providing the data provided through the PF interface in a data format of accuracy higher than that requested in the processing using the application program, and wherein the coupling processing program has a program for making the computer execute processing for adjusting a data format of the data provided through the PF interface so as to form a data format satisfying the required specification of the application program, and providing the adjusted data in accordance with the AP interface.

4. The control apparatus for a vehicle according to claim 1, wherein the platform program has a program for making the computer execute processing for providing data provided in accordance with the PF interface in sampling timing higher than that requested in the processing using the application program, and wherein the coupling processing program has a program for making the computer execute processing for adjusting provision timing of the data provided through the PF interface to the sampling timing of data satisfying the required specification, and providing these adjusted data by the AP interface.

5. The control apparatus for a vehicle according to claim 1, wherein the AP interface is constructed such that the data convened by the coupling processing program is referred to by the processing using the application program.

6. The control apparatus for a vehicle according to claim 1, wherein the AP interface is constructed such that the data convened by the coupling processing program are transmitted to the processing using the application program when there is a request of the data by the processing using the application program.

7. The control apparatus for a vehicle according to claim 1, wherein the platform program has an interruption processing program for making the computer input the data from the hardware device by interruption from the hardware device, and the interruption processing program has a program for making the computer execute processing for providing data based on an inputted result through the PF interface, and wherein the coupling processing program further has an acquiring program as a program for making the computer execute processing for receiving data through the PF interface during an inhibition of a dispatch of another processing. processing program.

* * * * *